(12) United States Patent
Dimitrova et al.

(10) Patent No.: US 12,032,084 B2
(45) Date of Patent: Jul. 9, 2024

(54) CONTROL OF THE MOVEMENT OF A MOBILE UNIT TOWARDS AN OBJECT BY ANALYZING RADIO AND ACOUSTIC SIGNALS

(71) Applicant: PSA AUTOMOBILES SA, Poissy (FR)

(72) Inventors: Zlatina Dimitrova, Versailles (FR); Giovanni Juin, Paris (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 18/261,458

(22) PCT Filed: Nov. 30, 2021

(86) PCT No.: PCT/FR2021/052132
§ 371 (c)(1),
(2) Date: Jul. 13, 2023

(87) PCT Pub. No.: WO2022/152980
PCT Pub. Date: Jul. 21, 2022

(65) Prior Publication Data
US 2024/0077572 A1 Mar. 7, 2024

(30) Foreign Application Priority Data

Jan. 18, 2021 (FR) ...................................... 2100437

(51) Int. Cl.
*G01S 5/02* (2010.01)
*G01S 5/00* (2006.01)
*G01S 5/18* (2006.01)

(52) U.S. Cl.
CPC .............. *G01S 5/0264* (2020.05); *G01S 5/01* (2020.05); *G01S 5/18* (2013.01)

(58) Field of Classification Search
CPC ... G01S 19/13; G01S 5/18; G01S 3/12; G01S 5/0284; G01S 1/76; G01S 11/16;
(Continued)

(56) References Cited

U.S. PATENT DOCUMENTS 6,680,688 B1 * 1/2004 Jiang ....................... G01S 11/16
367/124
9,667,284 B1 5/2017 Gean et al.
(Continued)

FOREIGN PATENT DOCUMENTS

WO 2020109678 A1 6/2020
WO 2020225226 A1 11/2020

OTHER PUBLICATIONS

International Search Report to corresponding PCT/FR2021/052132 mailed on Mar. 25, 2022.
(Continued)

*Primary Examiner* — Olumide Ajibade Akonai
(74) *Attorney, Agent, or Firm* — Sandberg Phoenix & von Gontard P.C.

(57) ABSTRACT

A control device (DC) equips a mobile unit (BM) comprising radio signal receivers (R11-R12) and acoustic signal receivers (R21-R22) and having to move to a target location defined relative to an object (V) emitting radio signals and acoustic signals. This device (DC) periodically determines the distance and direction separating a predefined location of the mobile unit (BM) from the target location by analyzing received radio signals, then commands suitable for moving the mobile unit (BM) to a predefined distance from the target location on the basis of this distance and direction, then periodically determines the distance and direction by analyzing received acoustic signals, then commands suitable for moving the mobile unit (BM) towards the target location on
(Continued)

the basis of this distance and direction, until the predefined location is placed at the target location.

10 Claims, 3 Drawing Sheets

(58) Field of Classification Search
CPC .. G01S 11/14; G01S 5/02213; G01S 5/02585; G01S 5/26; G01S 13/74; G01S 3/043; G01S 1/02; G01S 1/72; G01S 11/04; G01S 13/88; G01S 5/04; G01S 5/22; G01S 7/4069; G01S 17/931; G01S 17/89; G01S 13/862; G01S 15/931; H04B 11/00; H04S 2420/01; H04W 4/029; H04W 64/006; H04W 4/02; H04W 64/00; H04W 12/63; Y10S 901/01; Y10S 901/46; G05D 1/622; G06V 20/10; G06V 2201/07; G05B 2219/50391; G06T 2207/30241
See application file for complete search history.

(56) References Cited

U.S. PATENT DOCUMENTS

| | | | |
|---|---|---|---|
| 10,078,135 B1* | 9/2018 | Almada | G01S 5/30 |
| 11,275,164 B2* | 3/2022 | Yoon | H04W 4/023 |
| 2012/0263020 A1* | 10/2012 | Taylor | H04W 64/00 367/124 |
| 2016/0223640 A1 | 8/2016 | Vilermo et al. | |
| 2017/0208565 A1* | 7/2017 | Lowe | H04W 64/006 |
| 2018/0335502 A1* | 11/2018 | Lowe | G01S 5/02 |
| 2019/0049977 A1* | 2/2019 | Dean | G05D 1/0274 |
| 2020/0114515 A1* | 4/2020 | Thackston | B25J 9/1664 |
| 2020/0339119 A1* | 10/2020 | Ohmura | G06V 20/588 |
| 2022/0019213 A1* | 1/2022 | Haghighat Kashani | G05D 1/0231 |
| 2022/0113731 A1* | 4/2022 | Yesh | G05D 1/0274 |

OTHER PUBLICATIONS

Written Opinion to corresponding PCT/FR2021/052132 mailed on Mar. 25, 2022.

* cited by examiner

ND: CONTROL OF THE MOVEMENT OF A MOBILE UNIT TOWARDS AN OBJECT BY ANALYZING RADIO AND ACOUSTIC SIGNALS

This application is the US National Stage under 35 USC § 371 of International Application No. PCT/FR2021/052132, filed Nov. 30, 2021, which claims the priority of French application no. 2100437 filed on Jan. 18, 2021, the content (text, drawings and claims) of both said applications being incorporated by reference herein.

TECHNICAL FIELD

Mobile units (or robots) that have to move towards objects, and more precisely to controlling the movements of such mobile units, are described herein.

PRIOR ART

Some mobile units (or robots) are designed so as to move autonomously towards objects in order to provide at least one function. For this purpose they comprise movement means that are in charge of moving them (and therefore of making them move) autonomously on a road surface by analyzing data acquired by at least one on-board sensor. Herein, "autonomous movement" is understood to mean a movement that is controlled internally by a computer of the mobile unit so that the latter can travel from an initial location (such as, for example, a storage place) to a target location defined with respect to a target object.

This is for example the case of mobile charging units which are supplied with power by a power cable connected to a base and are arranged so as to charge a battery of a remote object by induction once they are placed under (at) a target location defined with respect to the latter. This is also the case, for example, of certain mine-clearing, or pollution-control, or fire-control, or transport, or parameter-measurement, or collection units (or robots).

It is recalled that a charging unit comprises a primary circuit including a primary coil supplied with power, by a power cable connected to its base, in order to transfer electrical energy by induction to a secondary coil forming part of a secondary circuit installed in a remote target object (such as, for example, a parked vehicle) and responsible for transforming the transferred electrical energy into charging current for the battery of this object. Such a charging unit generally is installed in a garage or a parking lot (public or private) comprising parking spaces in which vehicles can temporarily park.

Generally, the acquired data which are analyzed by the computer of a mobile unit (or robot) are environment data, such as, for example, images acquired by at least one on-board camera. One drawback of this mode of analysis lies in the fact that it has an error rate for determining the relative position of the target object with respect to the mobile unit (or robot) which is relatively high due to the light sensitivity of each on-board camera and soil that deposits on the lens of each on-board camera.

Another analysis mode has been proposed. It requires equipping the target object with an emitter of specific radio signals and the mobile unit with at least one radio signal receiver, and periodically determining by means of the computer of the mobile unit, by analyzing the received radio signals, the distance and direction separating a predefined location of the mobile unit from the defined target location with respect to the target object, then commands suitable for moving the mobile unit towards the target location based on these distance and direction determined. One disadvantage of this other mode of analysis lies in the fact that the positioning of the mobile unit (or robot) at the target location is relatively inaccurate, which can reduce the effectiveness of the function provided, or even prevent it from being carried out. By way of example, in the case of a charging unit, an offset of the centers of the primary and secondary circuits greater than 2 cm causes a reduction in the charging efficiency, which results in an increase in the charging time and/or an amount of electrical energy stored that is less than the intended amount.

The systems and methods described herein therefore aim especially to improve the situation.

SUMMARY

To this end, described herein is a control device, on the one hand, intended to be installed in a mobile unit comprising at least one radio signal receiver and having to move to a target location defined with respect to an object emitting radio signals, and, on the other hand, comprising at least one processor and at least one memory arranged so as to perform the operations that consist in periodically determining a distance separating a predefined location of the mobile unit from this target location and a direction connecting this predefined location and this target location by analyzing radio signals received by each radio signal receiver, then commands suitable for moving the mobile unit towards the target location based on these distance and direction determined.

This control device is characterized by the fact that, when the mobile unit also comprises at least one acoustic signal receiver and the object also emits acoustic signals, its processor and memory are arranged, once the mobile unit has arrived at a predefined distance from the target location, to perform the operations that consist in periodically determining the distance and direction by analyzing the acoustic signals received by each acoustic signal receiver, then commands suitable for moving the mobile unit towards the target location based on these distance and direction determined, until the predefined location of the mobile unit is placed at the target location.

By virtue of this two-phase movement of the mobile unit ("coarse" then "fine"), it is now possible to reliably obtain very precise positioning of the mobile unit, which guarantees the effectiveness of the function provided locally by the mobile unit.

The control device may include other features which can be taken separately or in combination, and especially:
  its processor and its memory can be arranged so as to perform the operations that consist, when the object emits radio signals having a predefined intensity, in periodically determining each distance by analyzing the intensity of the radio signals received by each radio signal receiver;
  its processor and its memory may be arranged so as to perform the operations that consist, when the mobile unit comprises first and second radio signal receivers having respectively first and second axes of the reception pattern differing by 90°, in periodically determining first and second radio signal reception angles with respect to the first and second axes of the reception pattern, respectively, then in determining the direction from the first and second reception angles determined;
  in the case of the last option, its processor and its memory can be arranged so as to perform the operations that consist in periodically determining a sector of space containing the target location, among four sectors of space, subdividing into four a plane defined by the first and second axes of the reception pattern, based on the values of the first and second reception angles determined, then in determining the direction based on this sector of space determined and the first and second reception angles;

in the case of the last sub-option, its processor and its memory can be arranged so as to perform the operations that consist in considering that the target location is contained in a first sector of space when the first and second reception angles are both positive, or that the target location is contained in a second sector of space located to the right of the first sector of space when the first reception angle is negative and the second reception angle is positive, or that the target location is contained in a third sector of space located to the right of the second sector of space when the first and second reception angles are both negative, or even that the target location is contained in a fourth sector of space located to the right of the third sector of space and to the left of the first sector of space when the first reception angle is positive and the second reception angle is negative;

its processor and its memory can be arranged so as to perform the operations that consist, when the mobile unit comprises at least first and second acoustic signal receivers, in periodically determining first and second times of reception of identical acoustic signals, then in determining the distance and direction from these first and second reception times.

Also described herein are mobile unit comprising at least one radio signal receiver suitable for receiving radio signals emitted by an object with respect to which a target location is defined towards which the mobile unit has to move, at least one acoustic signal receiver suitable for receiving acoustic signals emitted by this object, and a control device of the type presented hereinbefore.

For example, this mobile unit can be supplied with power by a power cable connected to a base and arranged so as to recharge a battery of the object by induction once a predefined location that it comprises is placed at the target location.

Also described is a control method, on the one hand, intended to control the movement of a mobile unit, comprising at least one radio signal receiver, to a target location defined with respect to an object emitting radio signals, and, on the other hand, comprising a first step in which a distance separating a predefined location of the mobile unit from this target location and a direction connecting the predefined location and the target location are periodically determined by analyzing radio signals received by each radio signal receiver, then commands suitable for moving the mobile unit towards the target location based on these distance and direction determined.

This control method is characterized in that:

when the mobile unit also comprises at least one acoustic signal receiver and the object also emits acoustic signals, its first step is carried out until the mobile unit has arrived at a predefined distance from the target location, and it then comprises a second step wherein the distance and direction are periodically determined by analyzing the acoustic signals received by each acoustic signal receiver, then commands suitable for moving the mobile unit towards the target location based on these determined distance and direction, until the predefined location of the mobile unit is placed at the target location.

Also described is a computer program product comprising a set of instructions which, when executed by processing means, is suitable for implementing a control method of the same type as presented hereinbefore in order to control the movement to a target location, defined with respect to an object emitting radio signals and acoustic signals, of a mobile unit comprising at least one radio signal receiver and at least one acoustic signal receiver.

BRIEF DESCRIPTION OF THE FIGURES

Other features and advantages will become apparent from examining the detailed description hereinafter, and the appended drawings, in which.

DETAILED DESCRIPTION

The object is especially to propose a control device DC, and an associated control method, intended to allow the control of the autonomous movements of a mobile unit (or robot) BM towards a remote (target) object V for the precise and reliable positioning of a predefined location ep that it comprises at a target location ec with respect to this target object V.

In what follows, by way of non-limiting example, it is considered that the mobile unit (or robot) BM is a charging unit arranged so as to charge a battery BR of a remote (target) object V by induction. However, the systems and methods described are not limited to this type of mobile unit. Indeed, they relate to any type of mobile unit with autonomous movement having to provide at least one function. Therefore, they also relate, for example, to mine-clearing, or pollution-control, or fire-control, or transport, or parameter-measurement, or collection units (or robots).

Moreover, it is considered in what follows, by way of non-limiting example, that the (target) object V is a motor vehicle (the battery BR of which must be charged by induction). This is for example a car, as shown in a non-limiting manner in FIG. 1. However, the systems and methods described are not limited to this type of target object. Indeed, they relate to any type of target object towards which a mobile unit (or robot) BM must move precisely to provide at least one function locally. Therefore, they relate especially to all vehicles (land, sea (or river) and aerial vehicles (including ultralight aircraft, drones, helicopters and flying taxis)).

In addition, it is considered in what follows, by way of non-limiting example, that the vehicle V comprises an all-electric power train. However, the vehicle may comprise a plug-in hybrid power train, that is to say, comprising at least one thermal prime mover and at least one electric prime mover coupled to at least one rechargeable battery BR.

Figure 1:
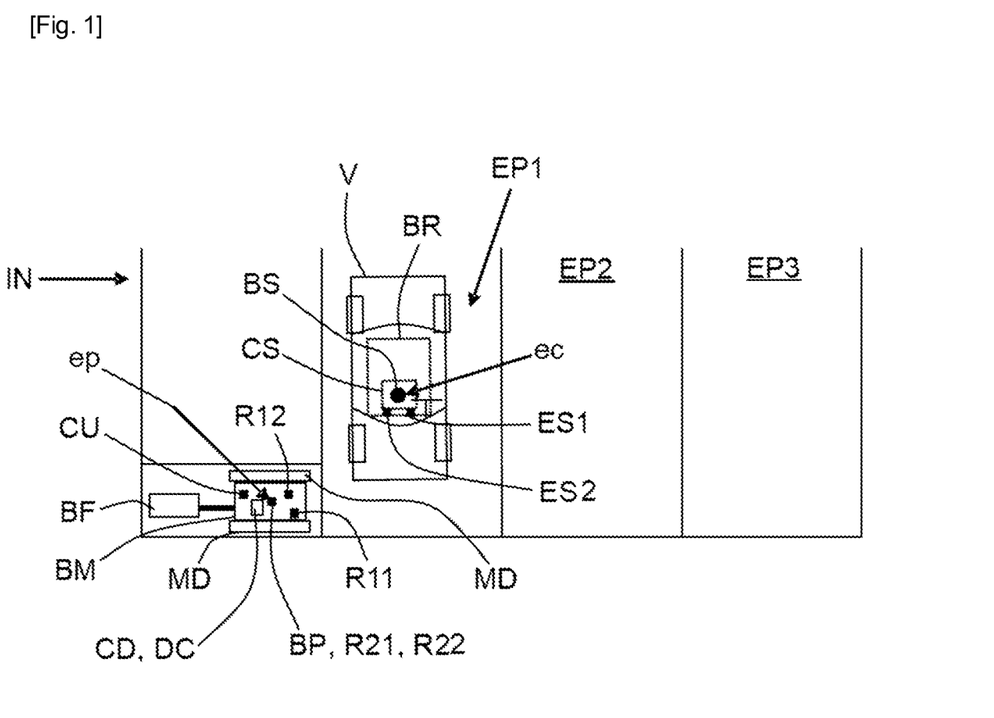
FIG. 1 schematically and functionally illustrates, in a top view, a parking facility comprising a road surface including three parking spaces, on one of which a vehicle is parked, the battery of which must be charged by induction by means of an embodiment of a mobile unit, FIG. 2 schematically and functionally illustrates an embodiment of a computer comprising a control device and intended to equip a mobile unit, FIG. 3 schematically illustrates within a diagram a plane subdivided into four sectors of space by two perpendicular axes materializing the directions of the reception patterns of two radio signal receivers, and on which the angles of reception by the latter of the radio signals originating from an object are materialized, and FIG. 4 schematically illustrates an example of an algorithm implementing a control method.

FIG. 1 schematically depicts an example of an installation IN constituting a parking lot comprising a road surface including three parking spaces EPj (j=1 to 3). As shown, this installation IN is equipped with a charging system comprising at least one base BF and a mobile unit BM (herein for charging) interconnected by a power cable CA.

In the example illustrated in a non-limiting manner in FIG. 1, the installation IN is only equipped with a single charging system. However, the installation IN could be equipped with several charging systems. Furthermore, in the example shown in a non-limiting manner in FIG. 1, the charging system only comprises a single mobile unit BM connected to its base BF via a power cable CA. However, the charging system SR may comprise several (at least two) mobile units BM connected to its base BF via associated power cables.

The mobile unit BM especially comprises movement means MD which are arranged so as to allow it to move towards the object V in order to precisely position a predefined location ep that it comprises at a target location ec with respect to this object V.

For example, and as shown in a non-limiting manner in FIG. 1, the movement means MD may comprise first and second track mechanisms rotated by first and second electric motors (not shown), the operation of which is controlled by an on-board computer CD. However, as a variant, the movement means MD may comprise at least three holonomic (or omnidirectional) wheels, optionally with rollers, rotated by electric motors independent of each other. Each electric motor can, for example, be powered by a battery, preferably rechargeable, that the mobile unit BM comprises (and which is not shown). It will be noted that it is possible (herein) to consider taking advantage of the charging phases of the vehicles V to charge this battery via the power cable CA which is then supplied with power.

The mobile unit BM also comprises at least one radio signal receiver R1j suitable for receiving radio signals emitted by a radio signal emitter ES1 that the object V comprises, and at least one acoustic signal receiver R2k suitable for receiving acoustic signals emitted by an acoustic signal emitter ES2 that the object V comprises.

For example, the radio signal emitter ES1 can be a Bluetooth-type emitter (optionally 5.1). In this case, each radio signal receiver R1j is a Bluetooth-type receiver (optionally 5.1). However, other types of radio signal emitter/receiver can be used, preferably short or medium range.

Also, for example, the acoustic signal emitter ES2 can emit sinusoidal acoustic signals, optionally with a frequency of 2000 Hz. In this case, each acoustic signal receiver R2k is a receiver suitable for receiving this frequency.

Due to the charging function that the mobile unit BM must provide, the latter comprises (herein) at least one primary circuit responsible for transferring the electrical energy produced from a current supplied by the power cable CA (connected to the base BF) by induction. Part of the primary circuit, the computer CD and part of the movement means MD are housed in an internal space of the mobile unit BM.

The primary circuit is coupled to an electrical power source of the base BF via the power cable CA, and herein is responsible for charging the rechargeable battery BR of the object (herein a vehicle) V, once the mobile unit BM is positioned precisely below the latter (V) so that a predefined location ep that it comprises is placed at a target location ec with respect to the latter (V). Herein, the predefined location ep is the center of a primary coil BP of the primary circuit, and the target location ec is placed at the center of a secondary coil BS of a secondary circuit CS of the object V (dedicated to charging by induction and coupled to the (rechargeable) battery BR).

The secondary circuit CS of the vehicle V also comprises a capacitor associated with its secondary coil BS, which is suitable for transforming electrical energy, transferred by the primary circuit of the mobile unit BM into charging current for the battery BR. The primary coil BP of the primary circuit is associated with a capacitor and powered by the power cable CA when it needs to transfer the electrical energy to the secondary coil BS of the secondary circuit CS by induction, after having been positioned precisely under this secondary coil BS. Preferably, the primary coil BP of the primary circuit is placed on the upper (external) face of an upper wall of the mobile unit BM.

In the example described herein, each acoustic signal receiver R2k may, for example, be installed in the vicinity of the center of the primary coil BP, and the acoustic signal emitter ES2 may be installed under the vehicle V at a known location with respect to the secondary coil BS and the target location ec. Likewise, each radio signal receiver R1j may, for example, be installed on the upper (external) face of the upper wall of the mobile unit BM, and the radio signal emitter ES1 may be installed under the vehicle V at a known location with respect to the secondary coil BS and the target location ec.

The power cable CA is preferably coupled to an automatic winder responsible for winding it, preferably in a controlled manner, so that it remains substantially taut during the movements of the mobile unit BM. For example, this automatic winder can be part of the mobile unit BM. However, it could be part of the base BF. It will be noted that the power cable CA is coupled to the primary circuit, optionally via at least one electronic circuit and/or at least one electronic component (optionally a power component).

The electrical power source of the base BF may be a wall box (making it possible to vary the current intensity), for example connected to an electrical power supply grid (or mains) and responsible for electrical power distribution and protection (circuit-breakers, fuses, differential protection), or an electrical power supply grid (or mains).

Figure 2:
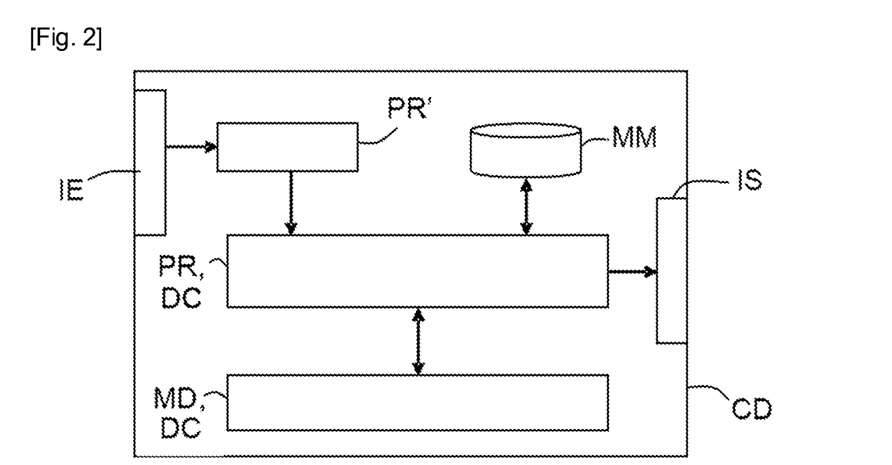

The mobile unit BM also comprises, necessarily, a control device DC including, as shown in a non-limiting manner in FIG. 2, at least one processor PR and at least one memory MD which are arranged so as to perform operations at least each time the mobile unit BM must be moved towards the object V.

It will be noted that in the example shown in a non-limiting manner in FIG. 2, the control device DC forms part of the on-board computer CD in the mobile unit BM and is produced in the form of a combination of electrical or electronic circuits or components (hardware) and software modules. This is advantageous because it is this computer CD that controls the electric motors of the movement means MD. However, in an alternative embodiment (not shown), the control device DC may be independent of the computer CD, while being coupled to the latter (CD).

The processor PR may, for example, be a Digital Signal Processor (DSP). This processor PR may comprise integrated circuits (or printed circuits), or several integrated circuits (or printed circuits) connected by wired or wireless connections. Integrated circuit (or printed circuit) means any type of device capable of performing at least one electrical or electronic operation. Thus, it may, for example, be a microcontroller.

The memory MD is RAM in order to store instructions for implementing by the processor PR at least part of the control method described hereunder (and therefore of its functionalities).

The above-mentioned operations (of the processor PR and the memory MD) consist firstly of periodically determining the distance d1, which separates the predefined location ep (of the mobile unit BM) from the target location ec (defined with respect to the object V), and the direction d2, which connects this predefined location ep and this target location ec, by analyzing radio signals received by each radio signal receiver R1$j$ (of the mobile unit BM). Then, these operations consist (during each period) in determining commands which are suitable for moving the mobile unit BM towards the target location ec based on the distance d1 and direction d2 that were just determined, until the mobile unit BM has arrived at a predefined distance dp from the target location ec.

For example, the predefined distance dp can be comprised between 50 cm and 100 cm.

Once the mobile unit BM has reached the predefined distance dp from the target location ec, the operations consist (during each period) in determining the distance d1 and direction d2 by analyzing acoustic signals received by each acoustic signal receiver R2$k$ (of the mobile unit BM). Then, these operations consist (during each period) in determining commands which are suitable for moving the mobile unit BM towards the target location ec based on the distance d1 and direction d2 that were just determined, until the predefined location ep (of the mobile unit BM) is placed at the target location ec. In the example described herein, once this latter placement has been carried out, the charging of the battery BR of the object V can begin (it will be noted that it is consecutive to the transmission of its charging request to the charging system that the object V begins to emit its radio and acoustic signals, and it is at the start of the actual charging phase that the object V stops emitting its radio and acoustic signals).

The movement of the mobile unit BM takes place in two phases: a first phase in which a "coarse" approach is carried out to reach the predefined distance dp by using the radio signals, and a second phase in which a "fine" or "final" approach is carried out to pass from the predefined distance dp to the target location ec using the acoustic signals. This makes it possible to reliably obtain a very precise positioning of the mobile unit BM (typically of the order of one or two centimeters), which guarantees the effectiveness of the function provided locally by the mobile unit BM.

It will be noted that the movement of the mobile unit BM is controlled via a control of the rotations of the electric motors of the movement means MD. In the presence of first and second electric motors, first $\Phi d$ and second $\Phi g$ rotations are therefore managed. In order to generate a control law for controlling these rotations, a kinematic model of the mobile unit BM can be defined, for example of the so-called "unicycle" type. The control variables are then the position (x, y) in a plane XY and the orientation $\theta$ in this plane XY.

The relations between the angles of rotation ($\Phi d$ and $\Phi g$) of the electric motors and the positions (x, y) of the mobile unit BM are then defined by the following differential equations:

$$\begin{pmatrix} \dot{x} \\ \dot{y} \\ \dot{\theta} \end{pmatrix} = \begin{pmatrix} \frac{r}{2}\cos(\theta) & \frac{r}{2}\cos(\theta) \\ \frac{r}{2}\sin(\theta) & \frac{r}{2}\sin(\theta) \\ -\frac{r}{2R} & \frac{r}{2R} \end{pmatrix} \cdot \begin{pmatrix} \dot{\phi}_g \\ \dot{\phi}_d \end{pmatrix},$$

wherein r is the radius of the right and left wheels driving (herein) the two tracks, 2R is the distance between these right and left wheels, and the dot (".") above the variables denotes the time derivative. Knowing the initial conditions, it is possible to retrieve the quantities (x, y, $\theta$) from the angles of rotation ($\Phi d$ and $\Phi g$), for example by using coders (angle of rotation sensors) installed on the electric motors.

By denoting as $u_1$ the linear speed of the mobile unit BM ($u_1 = \sqrt{\dot{x}^2+\dot{y}^2}$), and as $u_2$ the speed of rotation ($u_2 = \dot{\theta}$), the mobile unit BM can be controlled with the following relation (1):

$$\begin{pmatrix} \dot{\phi}_g \\ \dot{\phi}_d \end{pmatrix} = \begin{pmatrix} \frac{1}{r} & -\frac{R}{r} \\ \frac{1}{r} & \frac{R}{r} \end{pmatrix} \cdot \begin{pmatrix} u_1 \\ u_2 \end{pmatrix} = A \cdot \begin{pmatrix} u_1 \\ u_2 \end{pmatrix}.$$

Regardless of the phase considered, once the target object V is located with respect to the mobile unit BM (i.e. when d1 and d2 are known), a state feedback control law can be used. In this case, if e is the difference between the position of the mobile unit BM and the position of the target object V, it can be shown that ep can be made to converge towards ec using the following control law:

$$\begin{pmatrix} u_1 \\ u_2 \end{pmatrix} = (-k_1 \ -k_2) \cdot A^{-1} \cdot e,$$

wherein k1 and k2 are greater than 0. In addition, the commands can be connected to the electric motors by the relation (1).

It will be noted that the processor PR and the memory MD can also be arranged so as to perform the operations consisting, when the object V emits radio signals having a predefined intensity (and known to the control device DC), in periodically determining (in the first phase) each distance d1 by analyzing the intensity of the radio signals received by each radio signal receiver R1$j$. This method is known under the acronym RSSI (Received Signal Strength Indication). Indeed, it will be understood that in the absence of an obstacle, the distance d1 can be deduced from the difference between the received intensity and the predefined intensity (at the transmission location).

It will also be noted, as shown in a non-limiting manner in FIG. 1, that the mobile unit BM may comprise first R11 (j=1) and second R12 (j=2) radio signal receivers having respectively first a1 and second a2 axes of the reception pattern differing by 90°. In this case, the processor PR and the memory MD can be arranged so as to perform the operations that consist in periodically determining first $\alpha 1$ and second $\alpha 2$ radio signal reception angles with respect to the first a1 and second a2 axes respectively. Then, the processor PR and the memory MD can be arranged so as to perform the operations that consist in determining the direction d2 from the first $\alpha 1$ and second $\alpha 2$ reception angles that were just determined. This method based on the measurement of the angles of arrival $\alpha 1$ and $\alpha 2$ of the radio signals is known by the acronym AoA ("Angle of Arrival"). For each receiver R1j, the angle αi is measured over the range [−90°; +90°] and the differentiation between the radio signals coming from the front of a receiver R1j and those coming from the rear of this receiver R1j is determined due to the use of two receivers R1j.

Figure 3:
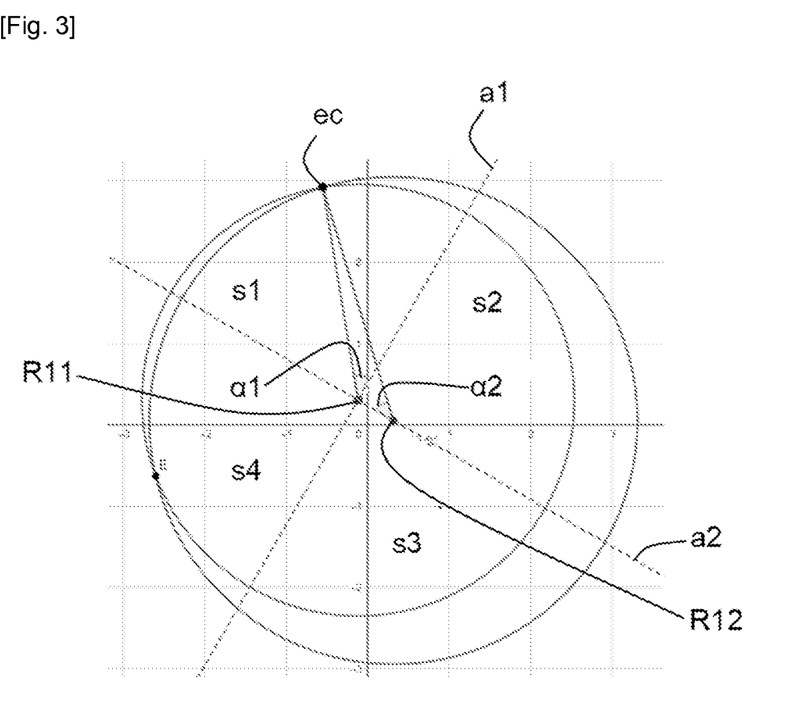

In order to remove certain directional ambiguities, the processor PR and the memory MD can implement the method for sectorization of space described hereunder with reference to the diagram of FIG. 3. Indeed, the processor PR and the memory MD can be arranged so as to perform the operations that consist in periodically determining a sector of space containing the target location ec among four sectors of space s1 to s4 which subdivide into four a plane defined by the first a1 and second a2 axes of the reception pattern (perpendicular to each other). This determination is carried out based on the values of the first α1 and second α2 reception angles determined. Then, the processor PR and the memory MD can be arranged so as to perform the operations that consist in determining (for each period) the direction d2 based on the sector of space determined and the values of the first α1 and second α2 reception angles.

For example, the processor PR and the memory MD can be arranged so as to perform the operations that consist in considering:
- that the target location ec is contained in a first sector of space s1 when the first α1 and second α2 reception angles are both positive, or
- that the target location ec is contained in a second sector of space located to the right of the first sector of space when the first reception angle α1 is negative and the second reception angle α2 is positive, or
- that the target location ec is contained in a third sector of space s3, located to the right of the second sector of space s2, when the first α1 and second α2 reception angles are both negative, or even
- that the target location ec is contained in a fourth sector of space s4, located to the right of the third sector of space s3 and to the left of the first sector of space s1, when the first reception angle α1 is positive and the second reception angle α2 is negative.

In the example shown in a non-limiting manner in FIG. 3, the first α1 and second α2 reception angles are both positive, which means that the target location ec is contained in the first sector of space s1.

It will also be noted, as shown in a non-limiting manner in FIG. 1, that the mobile unit BM may comprise first R21 (k=1) and second R22 (k=2) acoustic signal receivers. In this case, the processor PR and the memory MD can be arranged so as to perform the operations that consist in periodically determining first t1 and second t2 times of receiving identical acoustic signals (originating from the acoustic signal emitter ES2). Then, the processor PR and the memory MD can be arranged so as to perform the operations that consist in determining the direction d2 from these first t1 and second t2 receiving times that were just determined. For example, the Time Difference Of Arrival (TDOA) method (t1-t2) can be used to determine the distance d1 and direction d2.

It will also be noted, as shown in a non-limiting manner in FIG. 1, that the mobile unit BM can also comprise at least one ultrasound sensor CU emitting ultrasound in a part of its environment to detect obstacles in its path and estimate the distance thereto. In this case, the processor PR and the memory MD can be arranged so as to perform the operations that consist in periodically implementing an obstacle avoidance method, such as, for example, the one referred to as the "boundary field avoidance" method which uses modeling of obstacles in the form of circles in the plane XY of movement of the mobile unit BM, when it determines the commands of the electric motors of the movement means MD.

It will also be noted, as shown in a non-limiting manner in FIG. 2, that the computer CD can also comprise, in addition to the random access memory MD and processor PR of the control device DC, mass storage MM, especially for storing the intensities and reception angles of the determined radio signals, times of reception of the acoustic signals, and optional relative positions of the obstacles with respect to the mobile unit BM, and intermediate data involved in all its calculations and processes. Furthermore, this computer CD may also comprise an input interface IE for receiving at least the intensities and reception angles of the determined radio signals, the times of reception of the acoustic signals, and the optional relative positions of the obstacles with respect to the mobile unit BM, for use in calculations or processes, optionally after having shaped and/or demodulated and/or amplified them, in a manner known per se, by means of a digital signal processor PR'. In addition, this computer CD may also comprise an output interface IS, especially to deliver the commands of the electric motors of the movement means MD determined by the control device DC.

Figure 4:
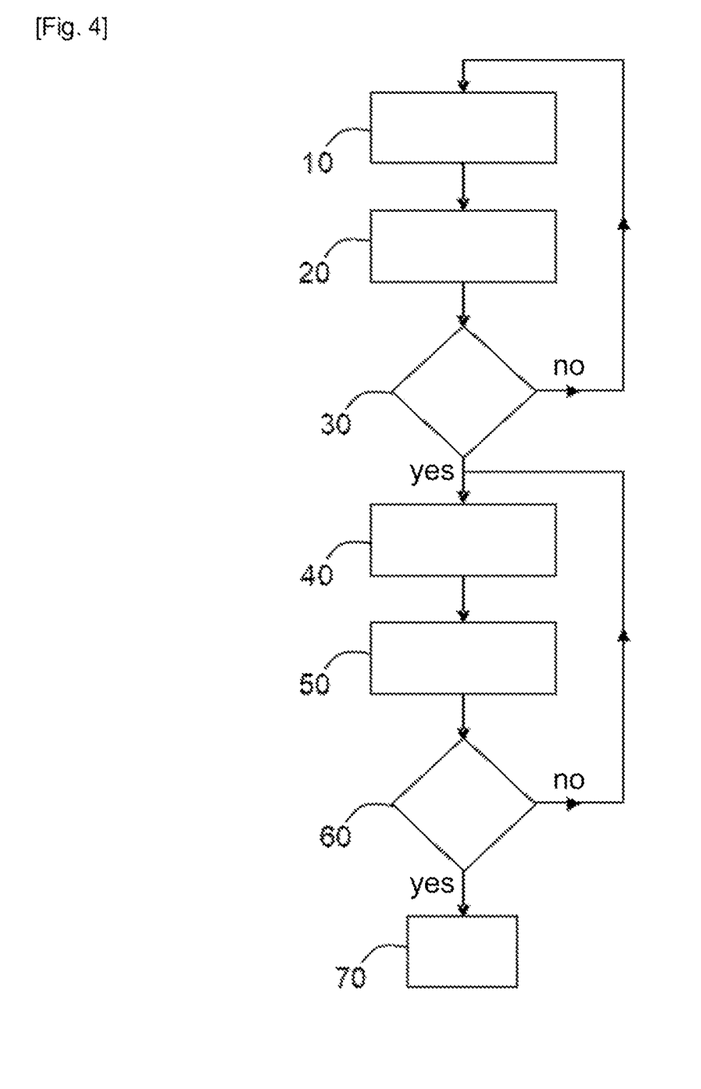

The methods described herein can also be considered in the form of a control method, intended to be implemented in the mobile unit BM described hereinbefore, and comprising a first step 10-30 ("coarse" approach) and a second step 40-70 ("fine" or "final" approach).

In the first step 10-30 (of the control method), the control device DC starts by periodically determining the distance d1, which separates the predefined location ep of the mobile unit BM from the target location ec (defined with respect to the object V) and the direction d2 which connects this predefined location ep and this target location ec, by analyzing the radio signals received by each radio signal receiver R1j (of the mobile unit BM). Then, commands are determined (by the control device DC) (at each period) which are suitable for moving the mobile unit BM towards the target location ec based on the distance d1 and direction d2 that were just determined, until the mobile unit BM has arrived at a predefined distance dp from the target location ec.

In the second step 40-70 (of the control method), the distance d1 and direction d2 are determined (by the control device DC) periodically by analyzing the acoustic signals received by each acoustic signal receiver R2k (of the mobile unit BM). Then, commands are determined (by the control device DC) (at each period) which are suitable for moving the mobile unit BM towards the target location ec based on the distance d1 and direction d2 that were just determined, until the predefined location ep is placed at the target location ec.

FIG. 4 schematically shows an example of an algorithm implementing a control method 10-70.

The algorithm comprises a sub-step 10 that begins when the control device DC is informed of a request to move towards the object V and the latter (V) begins to emit its radio and acoustic signals. In this sub-step 10, the distance d1, which separates the predefined location ep of the mobile unit BM from the target location ec, and the direction d2, which connects this predefined location ep and this target location ec, are determined (by the control device DC) by analyzing the radio signals received by each radio signal receiver R1j.

Then, in a sub-step 20, commands suitable for moving the mobile unit BM towards the target location ec based on the distance d1 and direction d2 determined in sub-step 10 are determined (by the control device DC).

Then, in a sub-step 30, it is determined (by the control device DC) whether the mobile unit BM has arrived at a predefined distance dp from the target location ec. If not ("no"), the control device DC returns to perform sub-step 10. If so ("yes"), this means that the mobile unit BM has reached the predefined distance dp from the target location ec, and therefore a sub-step 40 is performed (by the control device DC).

Sub-steps 10 to 30 constitute the first step of the control method.

In sub-step 40, the distance d1 and direction d2 are determined (by the control device DC) by analyzing the acoustic signals received by each acoustic signal receiver R2$k$.

Then, in a sub-step 50, commands suitable for moving the mobile unit BM towards the target location ec based on the distance d1 and direction d2 determined in sub-step 40 are determined (by the control device DC).

Then, in a sub-step 60, it is determined (by the control device DC) whether the predefined location ep of the mobile unit BM is placed at the target location ec. If not ("no"), the control device DC returns to perform sub-step 40. If so ("yes"), this means that the predefined location ep is placed at the target location ec and therefore that the mobile unit BM has arrived at its destination. The control method then ends in a sub-step 70.

Sub-steps 40 to 70 constitute the second step of the control method.

It will likewise be noted that the systems and methods described herein also comprise a computer program product (or IT program) comprising a set of instructions which, when executed by processing means of electronic circuit type (or hardware), such as, for example, the processor PR, is suitable for implementing the control method described hereinbefore to control the movement of the mobile unit BM to a target location ec (defined with respect to an object V emitting radio signals and acoustic signals).

The invention claimed is:

1. A control device for a mobile unit comprising at least one radio signal receiver, said mobile unit designed to move to a target location defined with respect to an object emitting radio signals, said control device comprising at least one processor and at least one memory arranged so as to perform the operations that comprise:
   periodically determining a distance separating a predefined location of said mobile unit from said target location and a direction connecting said predefined location and target location by analyzing said radio signals received by each radio signal receiver, and
   generating commands suitable for moving said mobile unit towards said target location based upon said determined distance and direction,
wherein when said mobile unit also comprises at least one acoustic signal receiver and said object emits acoustic signals, said processor and memory are arranged, once said mobile unit has arrived at a predefined distance from said target location, to perform the operations that comprise:
   periodically determining said distance and direction by analyzing said acoustic signals received by each acoustic signal receiver, and
   generating commands suitable for moving said mobile unit towards said target location based on said determined distance and direction, until said predefined location of the mobile unit is placed at said target location.

2. The device according to claim 1, wherein said processor and said memory are arranged so as to perform operations that comprise, when said object emits radio signals having a predefined intensity, periodically determining each distance by analyzing the intensity of said radio signals received by each radio signal receiver.

3. The device according to claim 1, wherein said processor and said memory are arranged so as to perform the operations that comprise, when said mobile unit comprises first and second radio signal receivers having respectively first and second reception pattern axes differing by 90°:
   periodically determining first and second reception angles of said radio signals with respect to said first and second reception pattern axes, respectively, and
   determining said direction from said first and second reception angles.

4. The device according to claim 3, wherein said processor and said memory are arranged so as to perform operations that comprise:
   periodically determining a determined sector of space containing said target location from four sectors of space by subdividing into four a plane defined by said first and second axes of the reception pattern, based on the values of said determined first and second reception angles, and
   determining said direction based on said determined sector of space and said first and second reception angles.

5. The device according to claim 4, wherein said processor and said memory are arranged so as to perform the operations of
   (1) considering that said target location is contained in a first sector of space when said first and second reception angles are both positive, or
   (2) considering said target location is contained in a second sector of space located to the right of said first sector of space when said first reception angle is negative and said second reception angle is positive, or
   (3) considering said target location is contained in a third sector of space located to the right of said second sector of space when said first and second reception angles are both negative, or
   (4) considering said target location is contained in a fourth sector of space located to the right of said third sector of space and to the left of said first sector of space when said first reception angle is positive and said second reception angle is negative.

6. The device according to claim 1, wherein that said processor and said memory are arranged so as to perform the operations that comprise, when said mobile unit comprises at least first and second acoustic signal receivers:
   periodically determining first and second reception times of identical acoustic signals, and
   then determining said distance and direction from said determined first and second reception times.

7. A mobile unit comprising at least one radio signal receiver suitable for receiving radio signals emitted by an object relative to which a target location is defined, wherein said mobile unit has to move toward said target location, wherein the mobile unit further comprises at least one acoustic signal receiver suitable for receiving acoustic signals emitted by said object and a control device according to claim 1.

8. The mobile unit according to claim 7, wherein the mobile unit is supplied with power by a power cable connected to a base and wherein the mobile unit is arranged so as to charge a battery of said object by induction once a predefined location that it comprises is placed at said target location.

9. A method for controlling the movement of a mobile unit comprising at least one radio signal receiver to a target location defined relative to an object emitting radio signals, said method comprising:
   a first step of periodically determining:
      a distance separating a predefined location of said mobile unit from said target location, and
      a direction connecting said predefined location and target location
   said determining comprising analyzing said radio signals received by each radio signal receiver, and then issuing commands suitable for moving said mobile unit towards said target location based on said determined distance and direction, wherein, when said mobile unit also comprises at least one acoustic signal receiver and said object also emits acoustic signals, said first step is performed until said mobile unit has arrived at a predefined distance from said target location, and
   a second step of periodically determining said distance and direction by analyzing said acoustic signals received by each acoustic signal receiver, then issuing commands suitable for moving said mobile unit towards said target location based on said determined distance and direction, until said predefined location of the mobile unit is placed at said target location.

10. A computer program product comprising a set of instructions stored in a non-transitory memory which, when executed by processing means, is suitable for implementing the control method according to claim 9 in order to control the movement to a target location, defined with respect to an object emitting radio signals and acoustic signals, of a mobile unit comprising at least one radio signal receiver and at least one acoustic signal receiver.

\* \* \* \* \*